United States Patent
Wang

(10) Patent No.: US 6,933,861 B2
(45) Date of Patent: Aug. 23, 2005

(54) KEY-OPERATING DEVICE FOR A HAND-HELD VIDEO GAME APPARATUS

(75) Inventor: Rocky Wang, Taipei (TW)

(73) Assignee: Alfadata Computer Corp. (TW)

( * ) Notice: Subject to any disclaimer, the term of this patent is extended or adjusted under 35 U.S.C. 154(b) by 466 days.

(21) Appl. No.: 10/307,145

(22) Filed: Nov. 29, 2002

(65) Prior Publication Data

US 2004/0104825 A1 Jun. 3, 2004

(51) Int. Cl.[7] .............................................. H03M 11/00
(52) U.S. Cl. ..................... 341/20; 345/156; D21/779; 423/46; 423/47; 423/36; 423/37; 423/38; 273/148 B; 361/679
(58) Field of Search ........................... 341/20; 345/156; D21/385, 779; 463/47, 36, 37, 38, 46; 273/148 B; 361/679

(56) References Cited

U.S. PATENT DOCUMENTS

| | | | | |
|---|---|---|---|---|
| 4,940,234 A | * | 7/1990 | Ishida et al. ................. | 273/442 |
| 5,056,787 A | * | 10/1991 | Mitsuyoshi ............. | 273/148 B |
| D380,503 S | * | 7/1997 | Tyler ......................... | D21/385 |
| D395,464 S | * | 6/1998 | Shiibashi et al. .......... | D21/385 |
| 5,823,876 A | * | 10/1998 | Unbehand ..................... | 463/37 |
| 5,829,745 A | * | 11/1998 | Houle ..................... | 273/148 B |
| 5,923,317 A | * | 7/1999 | Sayler et al. ................ | 345/156 |
| 6,083,106 A | * | 7/2000 | McDowell ..................... | 463/46 |
| 6,159,099 A | * | 12/2000 | Chen ........................... | 463/37 |
| 6,225,975 B1 | * | 5/2001 | Furuki et al. ................ | 345/156 |
| 6,279,906 B1 | * | 8/2001 | Sanderson et al. ....... | 273/148 B |
| 6,659,870 B2 | * | 12/2003 | Sobota ......................... | 463/37 |
| 6,773,349 B2 | * | 8/2004 | Hussaini et al. .............. | 463/38 |
| 6,776,104 B2 | * | 8/2004 | Herbst ......................... | 108/25 |
| 6,811,491 B1 | * | 11/2004 | Levenberg et al. ........... | 463/47 |

* cited by examiner

*Primary Examiner*—Albert K. Wong
(74) *Attorney, Agent, or Firm*—ipsolon llp

(57) ABSTRACT

A key-operating device includes a shell confining a chamber therein and connected to a video game apparatus with depressible keys, a lever pivotally mounted in the chamber and having protrusions projecting toward the keys, a wheel surrounding and connected to the shell and rotatable relative to the shell, and an actuating member projecting from the wheel and engageable with the lever in such a manner that rotation of the wheel results in engagement between the actuating member and the lever so as to permit fulcrum movement of the lever and pressing of the keys by the protrusions.

5 Claims, 12 Drawing Sheets

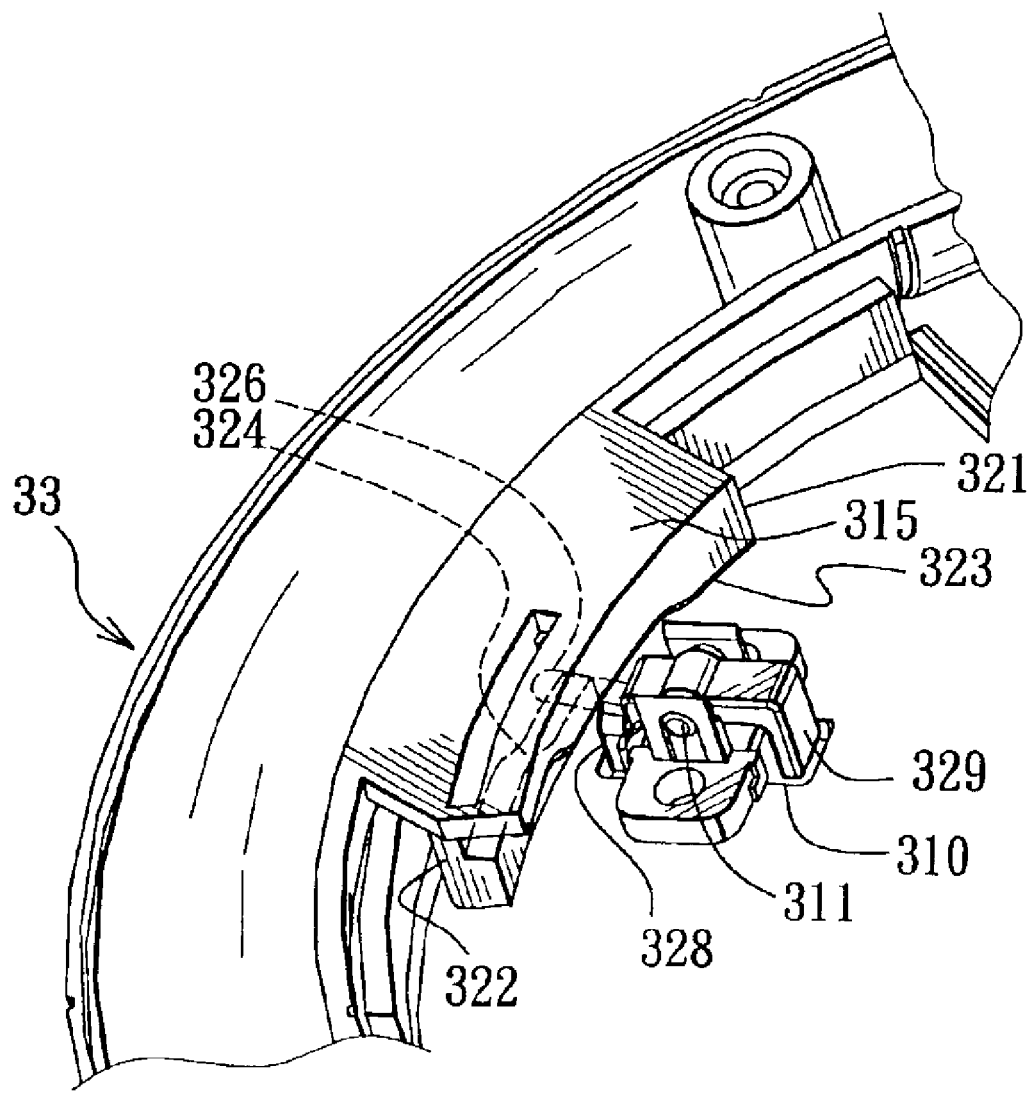
F I G. 4

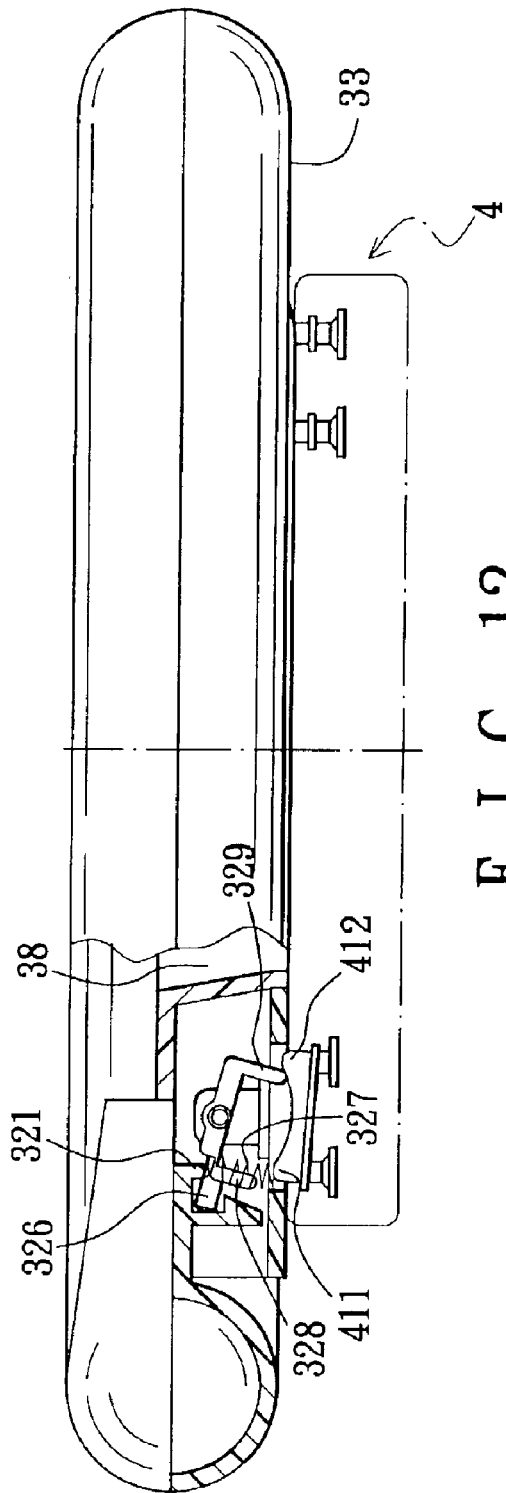
F I G. 12
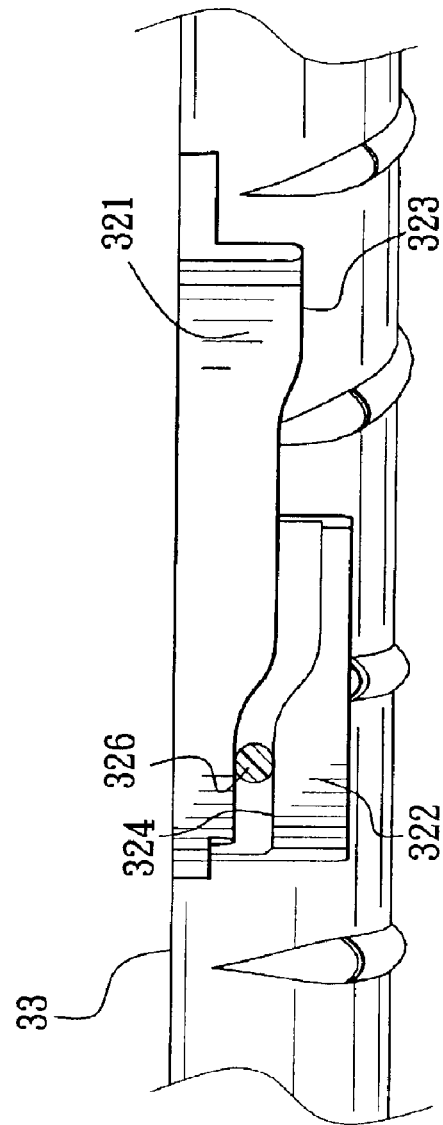
F I G. 13

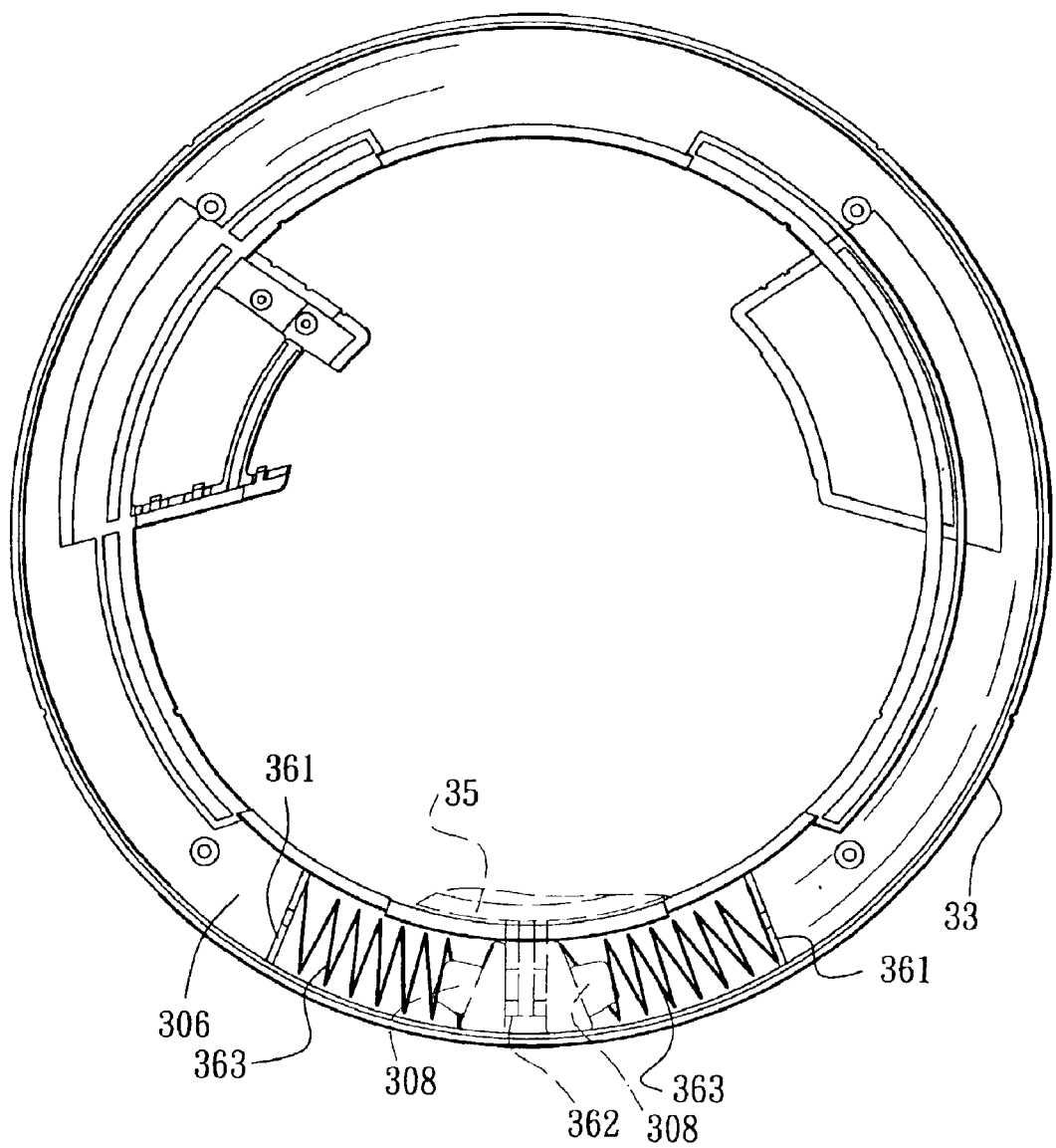
F I G. 14

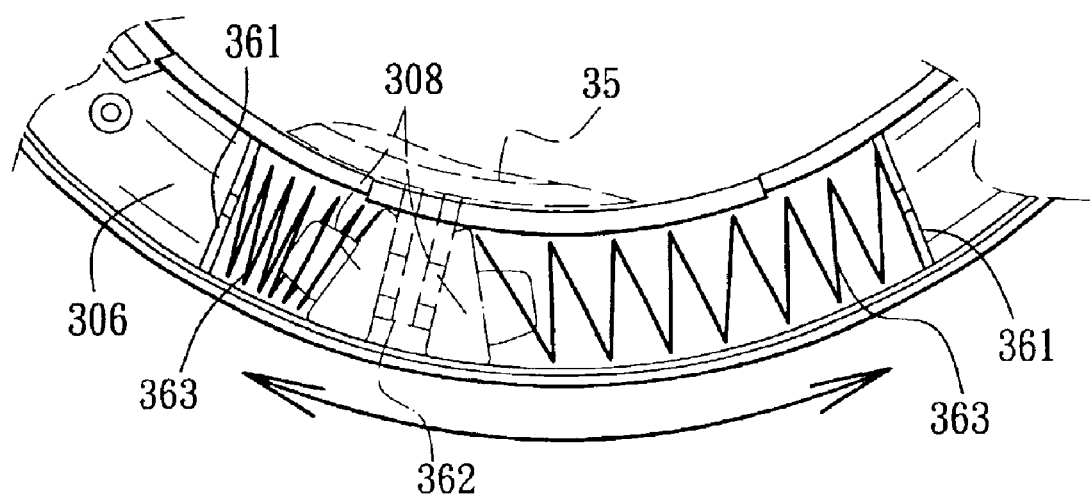
F I G. 15

US 6,933,861 B2

KEY-OPERATING DEVICE FOR A HAND-HELD VIDEO GAME APPARATUS

BACKGROUND OF THE INVENTION

1. Field of the Invention

This invention relates to a key-operating device, more particularly to a key-operating device for a hand-held video game apparatus.

2. Description of the Related Art

FIG. 1 illustrates a hand-held video game apparatus 4 that includes a display screen 40, and a key panel. The key panel normally includes left and right keys 411, 412, up and down keys 413, 414, a start key 42, a select key 43, and function keys 44, 45. The hand-held video game apparatus 4 is disadvantageous in that in some video games, such as car racing and flight, the pressing action of the keys on the key panel for moving a virtual object in the video game is completely distorted from the actual action of moving a real object in real life.

SUMMARY OF THE INVENTION

Therefore, the object of the present invention is to provide a hand-held video game apparatus with a key-operating device that is capable of overcoming the aforesaid drawbacks of the prior art.

According to the present invention, there is provided a key-operating device for a hand-held video game apparatus which has a display screen, depressible left and right keys, and a depressible function key. The key-operating device comprises: a shell including opposite front and rear shell halves that are coupled together to define a mounting chamber therebetween, the rear shell half having an inner rear face confining a rear side of the mounting chamber, and an outer rear face opposite to the inner rear face, the shell being formed with a central opening extending through the front and rear shell halves, the outer rear face being adapted to be connected to the hand-held video game apparatus in such a manner that the display screen can be viewed through the central opening, the outer rear face being formed with a key-receiving opening that is disposed adjacent to the central opening and that is adapted to receive the left and right keys therein, the front and rear shell halves including a pair of opposing wings extending oppositely away from the central opening; a spring-biased lever mounted pivotally on the inner rear face and having two opposite ends with key-pressing protrusions that are adapted to project rearwardly and respectively toward the left and right keys; an operating wheel having an annular inner face that surrounds the shell, and formed with a pair of circumferentially extending retaining slots that extend inwardly of the operating wheel from the annular inner face and that receive respectively the wings so as to permit rotation of the operating wheel relative to the shell between first and second angular positions; and an actuating member connected to and projecting from the annular inner face of the operating wheel toward the lever and engageable with the lever in such a manner that rotation of the operating wheel to the first angular position results in fulcrum movement of the lever in a first direction, which, in turn, results in pressing of one of the left and right keys by a respective one of the key-pressing protrusions, and that rotation of the operating wheel to the second angular position results in fulcrum movement of the lever in a second direction opposite to the first direction, which, in turn, results in pressing of the other one of the left and right keys by the other one of the key-pressing protrusions.

BRIEF DESCRIPTION OF THE DRAWINGS

In drawings which illustrate an embodiment of the invention,

FIG. 4 is a fragmentary perspective view illustrating configurations of an actuating member fixed to an operating wheel and a spring-biased lever of the key-operating device of FIG. 2;

FIG. 12 is a cutaway sectional view of the key-operating device shown in FIG. 11 viewed from one side;

FIG. 13 is a fragmentary sectional view of the key-operating device shown in FIG. 11 viewed from another side;

FIG. 14 is a fragmentary view to illustrate how a pair of returning coil springs of the key-operating device of FIG. 2 function to permit returning of the operating wheel from the first and second angular positions to the middle position; and FIG. 15 is a fragmentary view of the key-operating device of FIG. 2 to illustrate how one of the coil springs is compressed upon rotation of the operating wheel to one of the first and second angular positions.

DETAILED DESCRIPTION OF THE PREFERRED EMBODIMENT

Figure 1:
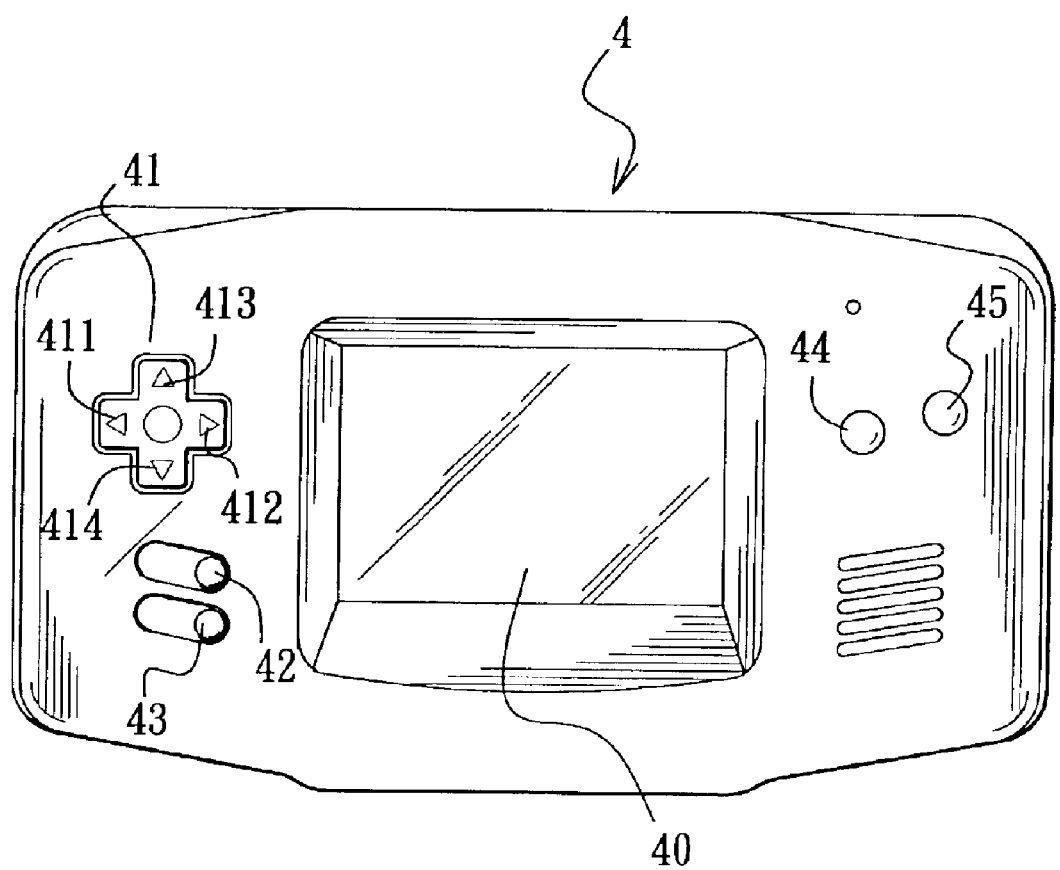
FIG. 1 is a front view of a conventional hand-held video game apparatus.

FIGS. 2 to 7 illustrate a preferred embodiment of a key-operating device 3 of this invention with the conventional hand-held video game apparatus 4 of FIG. 1 mounted thereon.

Figure 2:
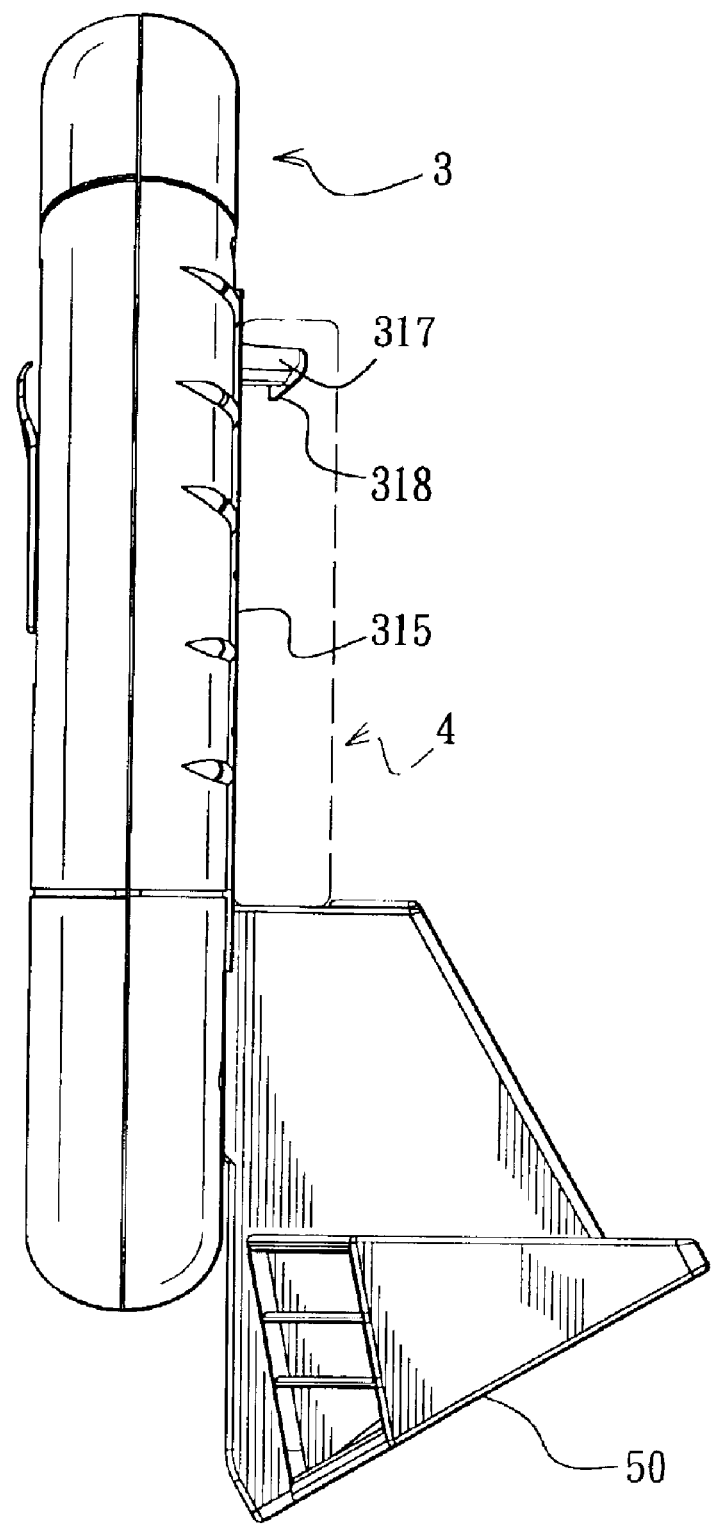
FIG. 2 is a side view of a preferred embodiment of a key-operating device according to the present invention with the hand-held video game apparatus of FIG. 1 mounted thereon.
Figure 8:
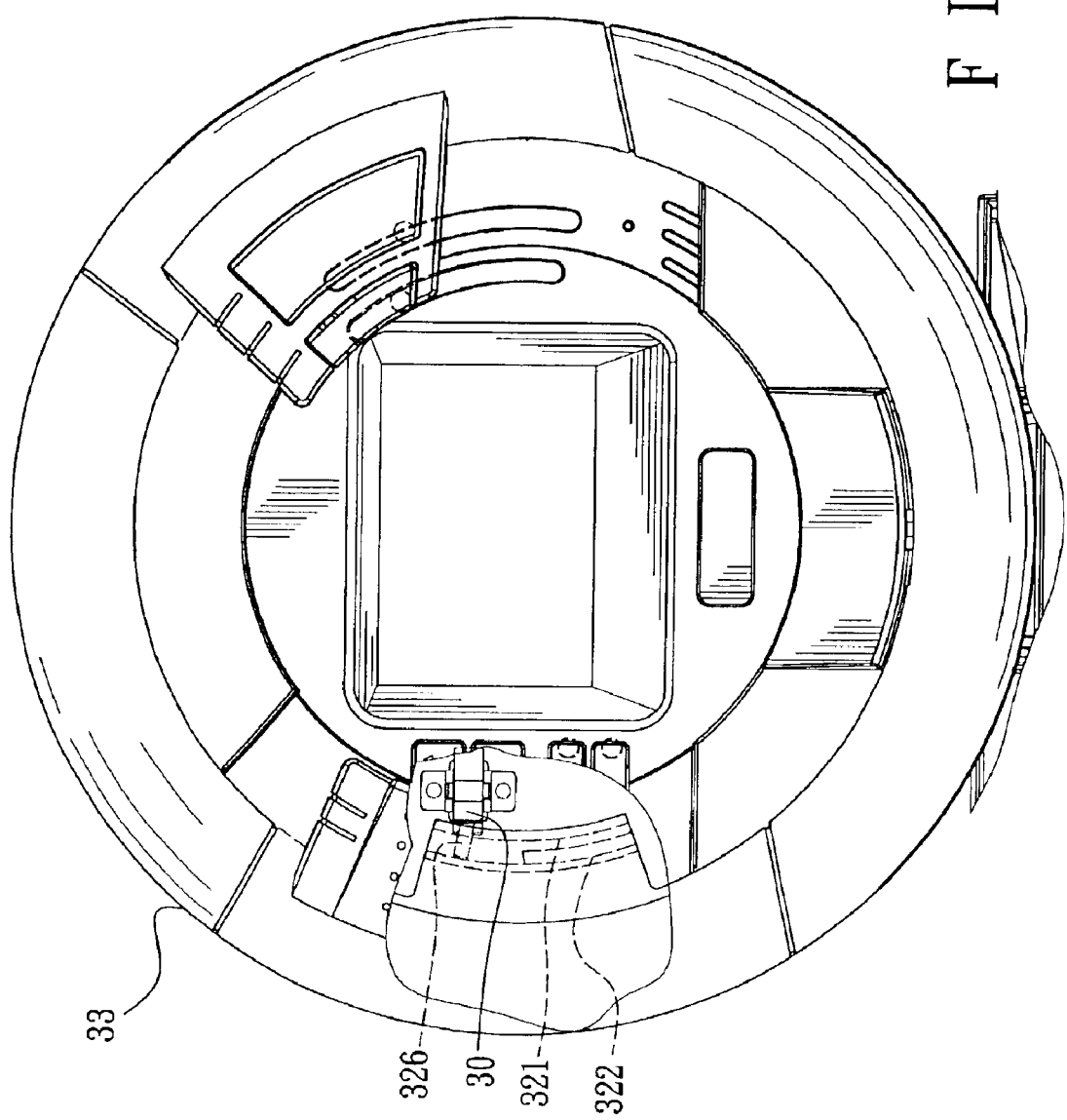
FIG. 8 is a front cutaway view of the key-operating device of FIG. 2 with the operating wheel positioned at a first angular position and with the spring-biased lever positioned at an actuated position.
Figure 9:
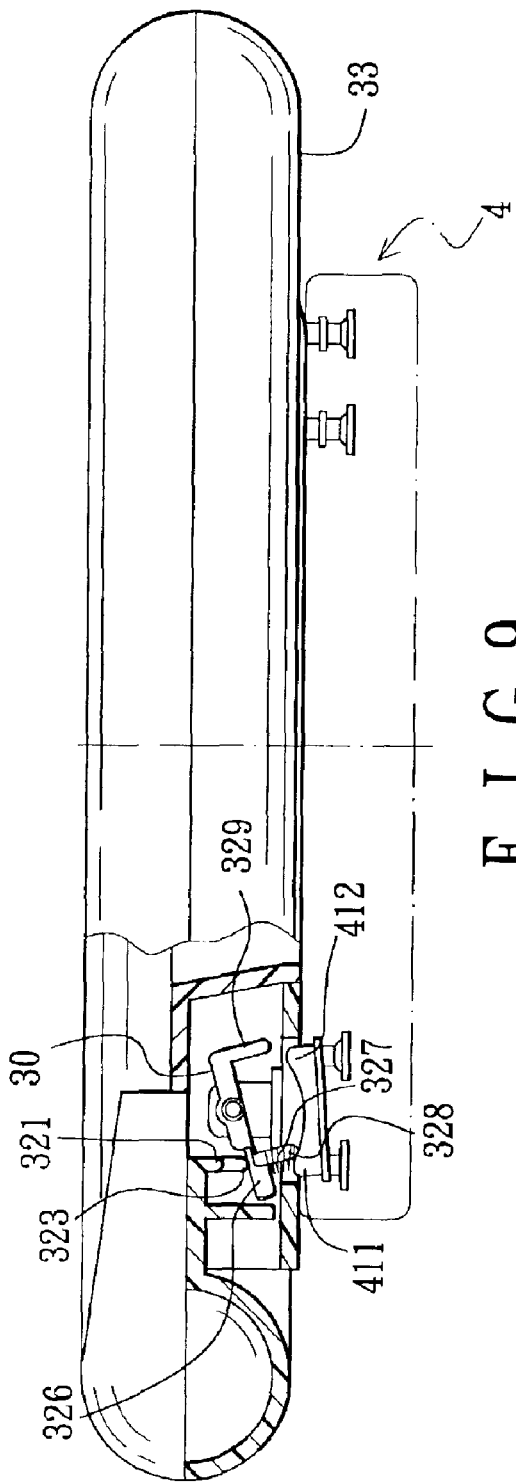
FIG. 9 is a cutaway sectional view of the key-operating device shown in FIG. 8 viewd from one side.
Figure 11:
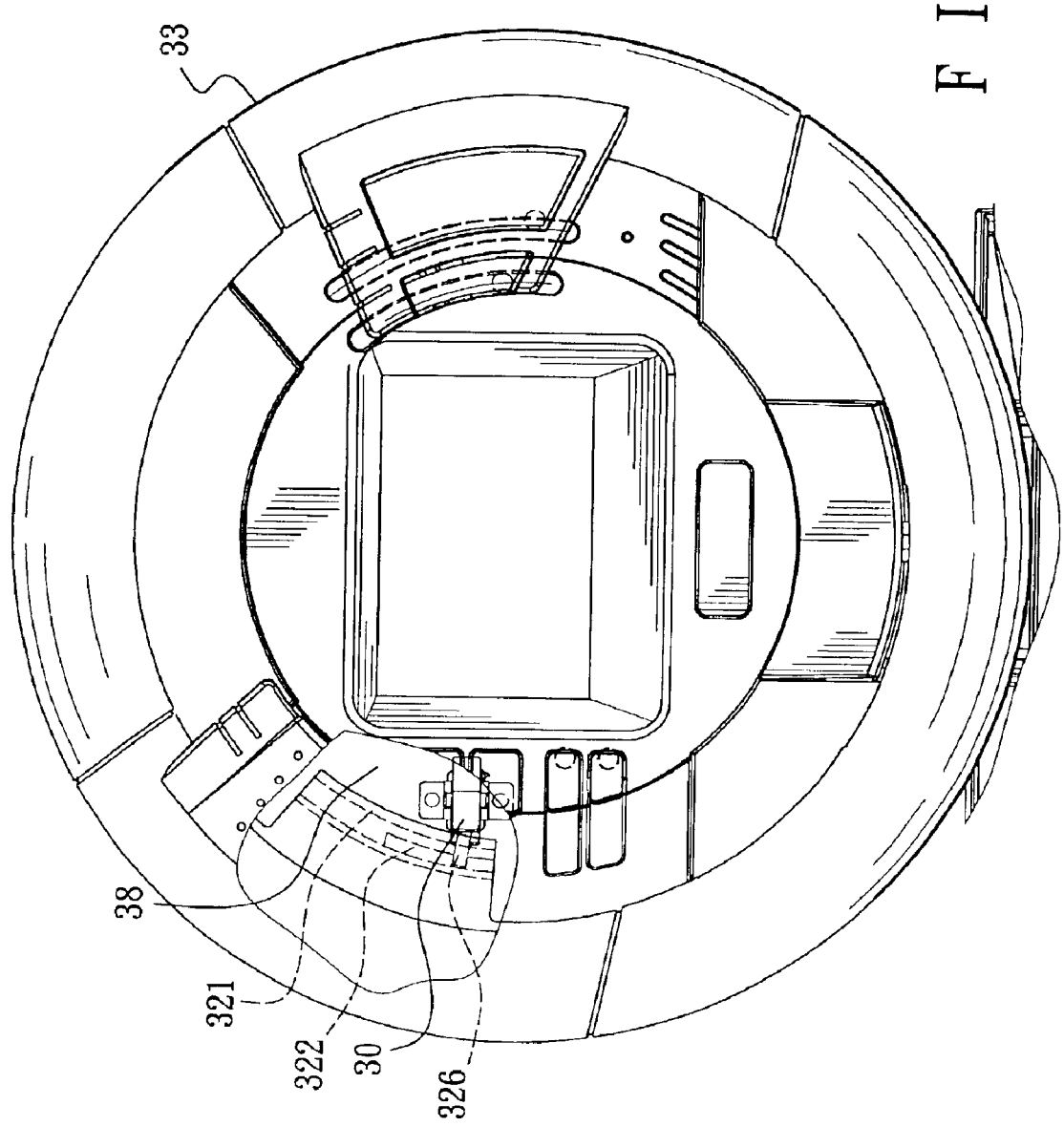
FIG. 11 is a front cutaway view of the key-operating device of FIG. 2 with the operating wheel positioned at a second angular position and with the spring-biased lever positioned at an actuated position.

The key-operating device 3 includes: a shell having opposite front and rear shell halves 35, 37 that are coupled together to define a mounting chamber 38 therebetween (see FIG. 5), the rear shell half 37 having an inner rear face 314 confining a rear side of the mounting chamber 38, and an outer rear face 315 opposite to the inner rear face 314, the shell being formed with a central opening 39 extending through the front and rear shell halves 35, 37, the outer rear face 315 being connected to the hand-held video game apparatus 4 in such a manner that the display screen 40 can be viewed through the central opening 39, the outer rear face 315 being formed with a key-receiving opening 310 (see FIGS. 3 and 6) that is disposed adjacent to the central opening 39 and that receives the left and right keys 411, 412 therein, the front and rear shell halves 35, 37 including a pair of opposing wings 350 extending oppositely in a direction away from the central opening 39; a spring-biased lever 30 mounted pivotally on the inner rear face 314 through a pivot 311 and having two opposite ends with key-pressing protrusions 328, 329 that project rearwardly and respectively toward the left and right keys 411, 412; an operating wheel 33 having an annular inner face 300 that surrounds the shell, and formed with a pair of circumferentially extending retaining slots 301 (see FIG. 6) that extend inwardly of the operating wheel 33 from the annular inner face 300 and that receive respectively the wings 350 so as to permit rotation of the operating wheel 33 relative to the shell between first and second angular positions (see FIGS. 8 and 11); and an actuating member 32 connected to and projecting from the annular inner face 300 of the operating wheel 33 toward the lever 30 and engageable with the lever 30 in such a manner that rotation of the operating wheel 33 to the first angular position results in fulcrum movement of the lever 30 in a first direction, which, in turn, results in pressing of the left key 411 by the key-pressing protrusion 328 (see FIG. 9), and that rotation of the operating wheel 33 to the second angular position results in fulcrum movement of the lever 30 in a second direction opposite to the first direction, which, in turn, results in pressing of the right key 412 by the key-pressing protrusion 329 (see FIG. 12). A pair of retaining protrusions 317 (only one of the retaining protrusions 317 is shown in FIG. 2) project from the outer rear face 315 of the rear shell half 37. Each of the retaining protrusions 317 has a hook end 318 for holding firmly the hand-held video game apparatus 4. A stand 50 is provided on the key-operating device 3, and extends from the rear shell half 37.

Figure 10:
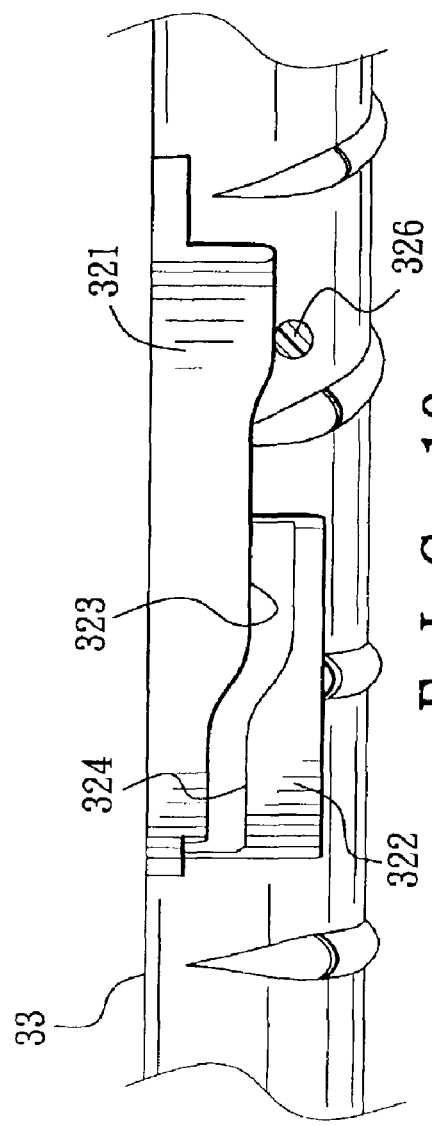
FIG. 10 is a fragmentary sectional view of the key-operating device shown in FIG. 8 viewed from another side.

The actuating member 32 includes an extension plate 315 connected to and projecting from the annular inner face 300 of the operating wheel 33 toward the lever 30, front and rear driving protrusions 321, 322 that project from the extension plate 315, that cooperatively define a gap 320 therebetween, and that respectively have rear and front inclined faces 323, 324 facing oppositely (see FIG. 4), and a driven protrusion 326 that projects from an adjacent one of the ends of the lever 30 into the gap 320. The rear and front inclined faces 323, 324 face toward the driven protrusion 326, and extend in a circumferential direction relative to the operating wheel 33 (see FIG. 7). The rear and front inclined faces 323, 324 are inclined oppositely in the circumferential direction in such a manner that the rear inclined face 323 presses the driven protrusion 326 in a rearward direction (see FIG. 10) upon rotation of the operating wheel 33 to the first angular position, thereby permitting fulcrum movement of the lever 30 in the first direction, and that the front inclined face 324 presses the driven protrusion 326 in a frontward direction (see FIG. 13) upon rotation of the operating wheel 33 to the second angular position, thereby permitting fulcrum movement of the lever 30 in the second direction.

The spring-biased lever 30 includes an urging member 327 sleeved on the key-pressing protrusion 328 and abutting against a respective one of the ends of the lever 30 so as to permit returning of the lever 30 to a non-actuated position (see FIG. 6), in which, the key-pressing protrusions 328, 329 disengage simultaneously and respectively from the left and right keys 411, 412.

Referring to FIGS. 14 and 15, the operating wheel 33 confines an annular chamber 306 therein, and is further formed with a pair of radially extending spring-abutting ribs 361 in the annular chamber 306. The shell further includes a spring-pushing arm 362 projecting therefrom into the annular chamber 306 between the spring-abutting ribs 361. The key-operating device 3 further includes a pair of returning coil springs 363 disposed respectively between the spring-pushing arm 362 and one of the spring-abutting ribs 361 and between the spring-pushing arm 362 and the other one of the spring-abutting ribs 361 and abutting against the spring-pushing arm 362 and the spring-abutting ribs 361 so as to permit returning of the operating wheel 33 to a middle position (see FIG. 5) between the first and second angular positions when the operating wheel 33 is positioned at one of the first and second angular positions. A pair of retaining members 308 project oppositely from two opposite sides of the spring-pushing arm 362. The returning coil springs 363 have retaining ends sleeved on and abutting against the retaining members 308, respectively.

Figure 3:
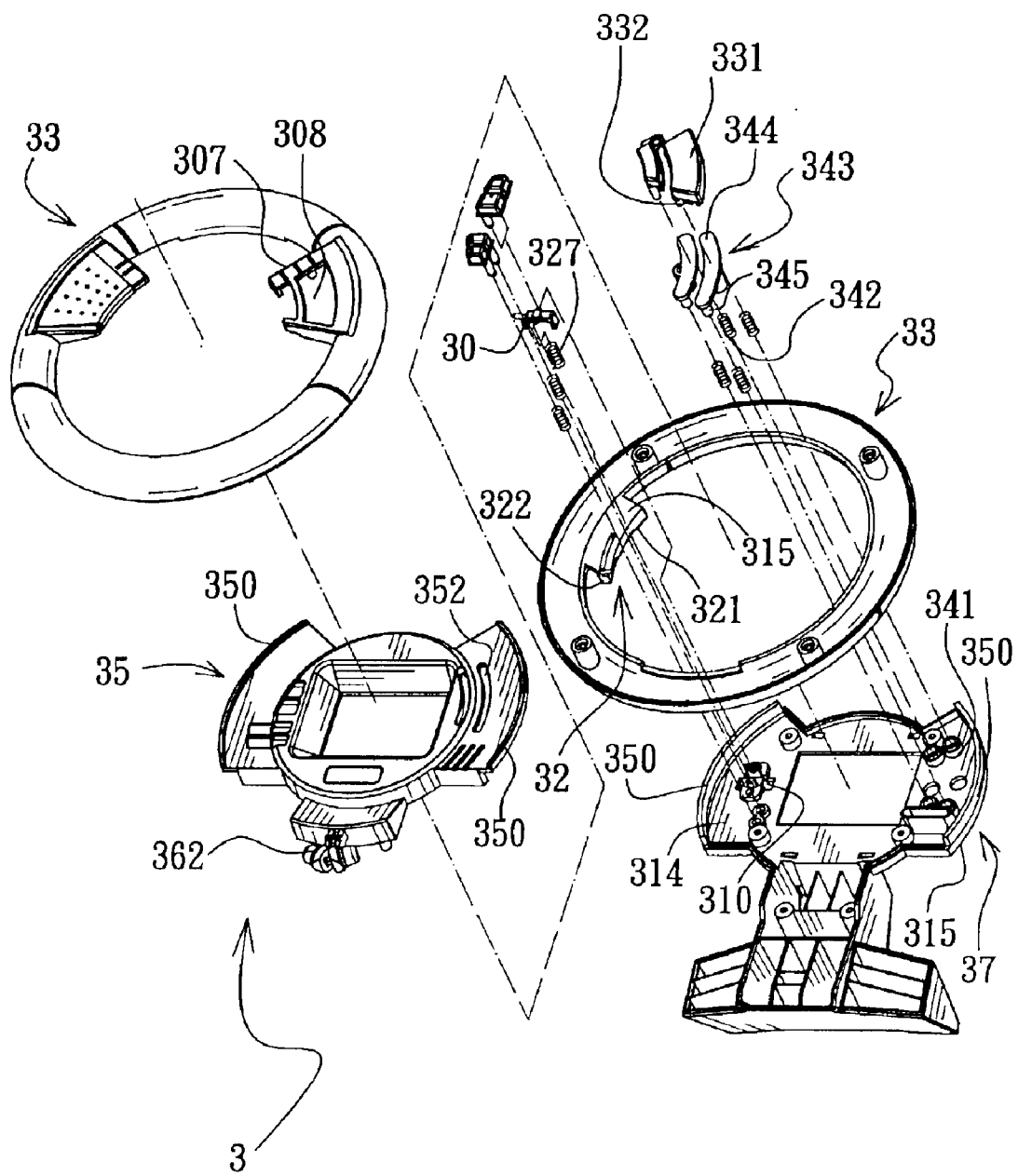
FIG. 3 is an exploded perspective view of the key-operating device of FIG. 2.
Figure 5:
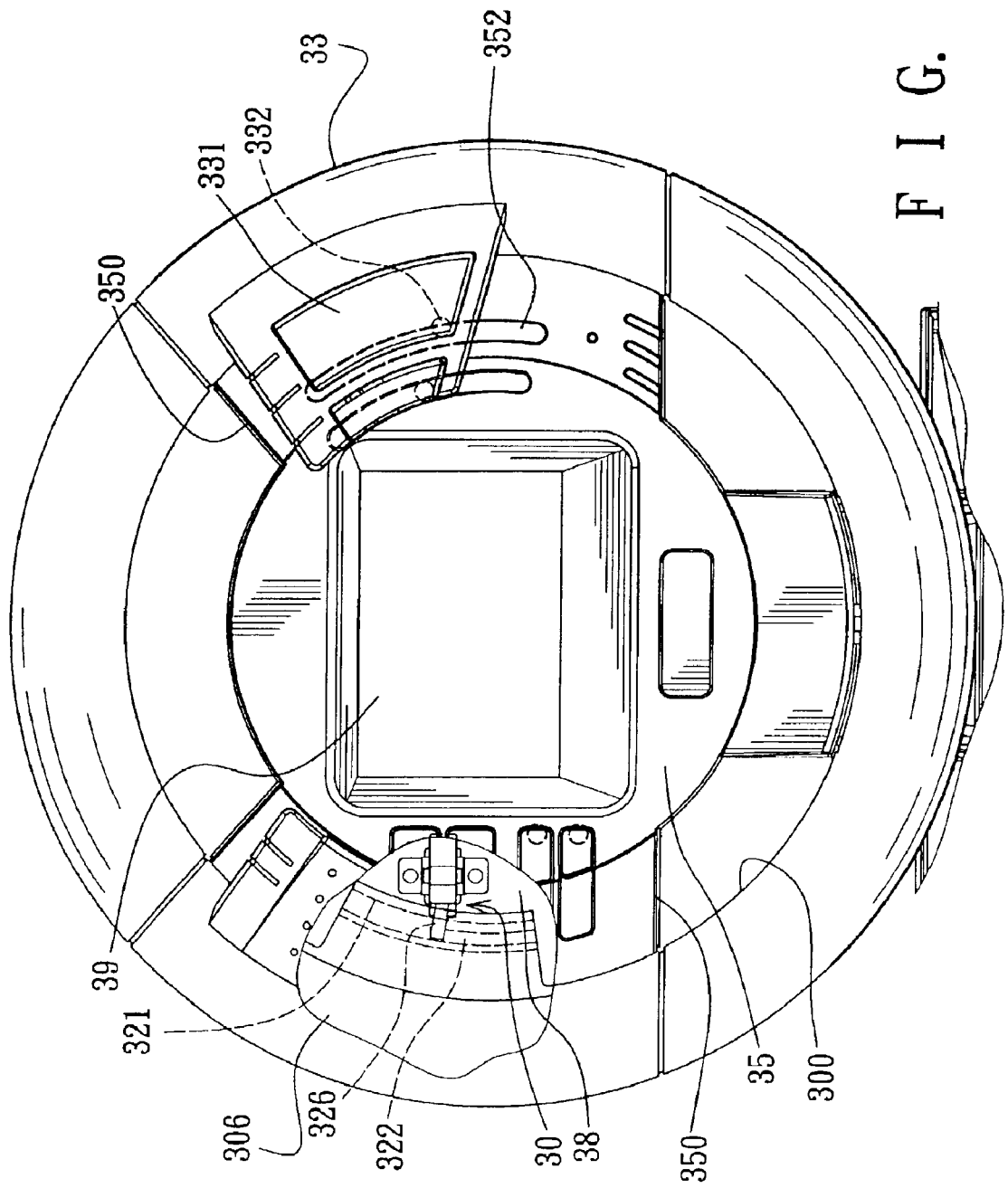
FIG. 5 is a front cutaway view of the key-operating device of FIG. 2 with the operating wheel at a middle position and with the spring-biased lever positioned at a non-actuated position.
Figure 6:
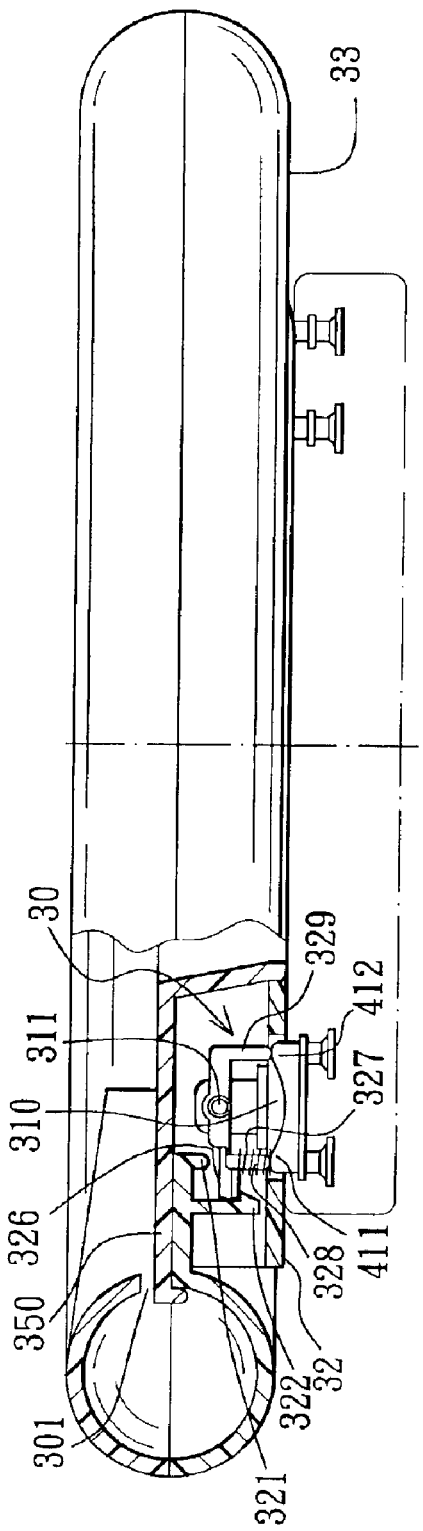
FIG. 6 is a cutaway sectional view of the key-operating device shown in FIG. 5 viewed from one side.
Figure 7:
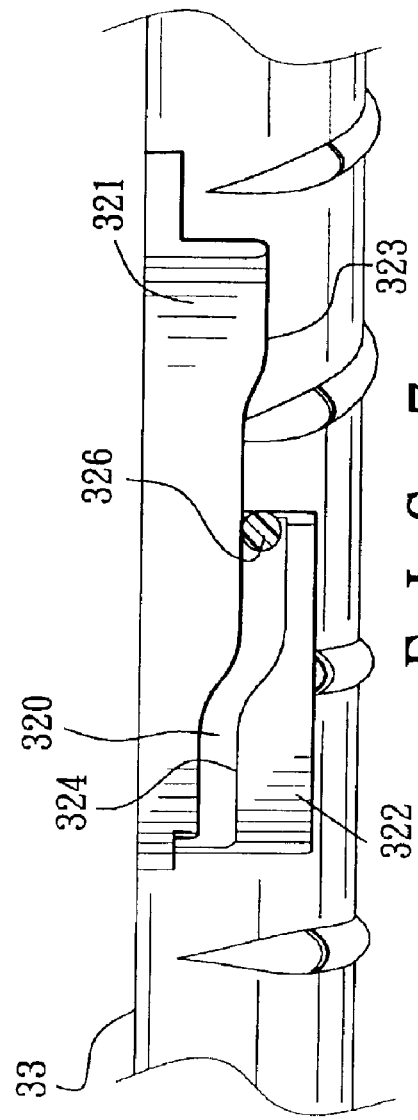
FIG. 7 is a fragmentary sectional view of the key-operating device shown in FIG. 5 viewed from another side.

Referring now to FIGS. 3 and 5, the front shell half 35 is formed with an arcuate elongated opening 352 that has two opposite ends. The rear shell half 37 is formed with a through-hole 341 that is registered with one of the ends of the elongated opening 352 and that is registered with the function key 45. The operating wheel 33 further includes a mounting tab 307 projecting from the annular inner face 300 toward the central opening 39 and formed with a button-mounting hole 308 that is registered with and that is disposed frontwardly of the elongated opening 352. The key-operating device 3 further includes a button 331 that is mounted on the mounting tab 307, that projects movably through the button-mounting hole 308, and that has a first pushing protrusion 332 which projects rearwardly through the elongated opening 352 and which is movable together with the button 331 along the length of the elongated opening 352 upon rotation of the operating wheel 33. The key-operating device 3 further includes a spring-biased pressing member 343 that is mounted movably in the mounting chamber 38 and that has an elongated plate 344 which is disposed rearwardly and which covers the elongated opening 352, and a second pushing protrusion 345 which projects rearwardly from the elongated plate 344 and through the through-hole 341 in the rear shell half 37. The button 331 is depressible rearwardly so as to push the elongated plate 344 through the first pushing protrusion 332, which, in turn, results in pressing of the function key 445 by the second pushing protrusion 345. A returning coil spring 342 is sleeved on the second pushing protrusion 345 so as to permit returning of the button 331 and the pressing member 343 from a depressed state to a non-depressed state.

In operation, when playing a video game, such as a car racing game, with the use of the hand-held video game apparatus 4, left and right movements of the car in the video game can be controlled by rotation of the operating wheel 33. As such, the operating wheel 33 can provide a better simulation of driving a real car, thereby eliminating the aforesaid drawback associated with the prior art.

With the invention thus explained, it is apparent that various modifications and variations can be made without departing from the spirit of the present invention. It is therefore intended that the invention be limited only as recited in the appended claims.

I claim:

1. A key-operating device for a hand-held video game apparatus which has a display screen, depressible left and right keys, and a depressible function key, said key-operating device comprising:

a shell including opposite front and rear shell halves that are coupled together to define a mounting chamber therebetween, said rear shell half having an inner rear face confining a rear side of said mounting chamber, and an outer rear face opposite to said inner rear face, said shell being formed with a central opening extending through said front and rear shell halves, said outer rear face being adapted to be connected to the hand-held video game apparatus in such a manner that the display screen can be viewed through said central opening, said outer rear face being formed with a key-receiving opening that is disposed adjacent to said central opening and that is adapted to receive the left and right keys therein, said front and rear shell halves including a pair of opposing wings extending oppositely in a direction away from said central opening;

a spring-biased lever mounted pivotally on said inner rear face and having two opposite ends with key-pressing protrusions that are adapted to project rearwardly and respectively toward the left and right keys;

an operating wheel having an annular inner face that surrounds said shell, and formed with a pair of circumferentially extending retaining slots that extend inwardly of said operating wheel from said annular inner face and that receive respectively said wings so as to permit rotation of said operating wheel relative to said shell between first and second angular positions; and an actuating member connected to and projecting from said annular inner face of said operating wheel toward said lever and engageable with said lever in such a manner that rotation of said operating wheel to said first angular position results in fulcrum movement of said lever in a first direction, which, in turn, results in pressing of one of the left and right keys by a respective one of said key-pressing protrusions, and that rotation of said operating wheel to said second angular position results in fulcrum movement of said lever in a second direction opposite to said first direction, which, in turn, results in pressing of the other one of the left and right keys by the other one of said key-pressing protrusions.

2. The key-operating device of claim 1, wherein said actuating member includes front and rear driving protrusions that cooperatively define a gap therebetween, and that respectively have rear and front inclined faces facing oppositely, and a driven protrusion that projects from an adjacent one of said ends of said lever into said gap, said front and rear inclined faces facing toward said driven protrusion and extending in a circumferential direction relative to said operating wheel, said front and rear inclined faces being inclined oppositely in said circumferential direction in such a manner that said rear inclined face presses said driven protrusion in a rearward direction upon rotation of said operating wheel to said first angular position, thereby permitting fulcrum movement of said lever in said first direction, and that said front inclined face presses said driven protrusion in a frontward direction upon rotation of said operating wheel to said second angular position, thereby permitting fulcrum movement of said lever in said second direction.

3. The key-operating device of claim 1, wherein said spring-biased lever includes an urging member sleeved on one of said key-pressing protrusions and abutting against a respective one of said ends of said lever so as to permit returning of said lever to a non-actuated position, in which, said key-pressing protrusions are adapted to disengage simultaneously and respectively from the left and right keys.

4. The key-operating device of claim 1, wherein said operating wheel confines an annular chamber therein, and is further formed with a pair of radially extending spring-abutting ribs in said annular chamber, said shell further including a spring-pushing arm projecting therefrom into said annular chamber between said spring-abutting ribs, said key-operating device further comprising a pair of coil springs disposed respectively between said spring-pushing arm and one of said spring-abutting ribs and between said spring-pushing arm and the other one of said spring-abutting ribs and abutting against said spring-pushing arm and said spring-abutting ribs so as to permit returning of said operating wheel to a middle position between said first and second angular positions when said operating wheel is positioned at one of said first and second angular positions.

5. The key-operating device of claim 1, wherein said front shell half is formed with an arcuate elongated opening that has two opposite ends, said rear shell half being formed with a through-hole that is registered with one of said ends of said elongated opening and that is adapted to be registered with the function key, said operating wheel further including a mounting tab projecting from said annular inner face toward said central opening and formed with a button-mounting hole that is registered with and that is disposed frontwardly of said elongated opening, said key-operating device further comprising a button that is mounted on said mounting tab, that projects movably through said button-mounting hole, and that has a first pushing protrusion which projects rearwardly into and through said elongated opening and which is movable together with said button along the length of said elongated opening upon rotation of said operating wheel, said key-operating device further comprising a spring-biased pressing member that is mounted movably in said mounting chamber and that has an elongated plate which is disposed rearwardly and which covers said elongated opening, and a second pushing protrusion which projects rearwardly from said elongated plate and through said through-hole in said rear shell half, said button being depressible rearwardly so as to push said elongated plate through said first pushing protrusion, which, in turn, results in pressing of the function key by said second pushing protrusion.

* * * * *